2 Sheets—Sheet 1.

F. W. BECKER.
Stock Car.

No. 229,659. Patented July 6, 1880.

WITNESSES
Robert Ewart,
James J. Sheehy.

INVENTOR
Frederick W. Becker.
Gilmore, Smith & Co,
ATTORNEYS

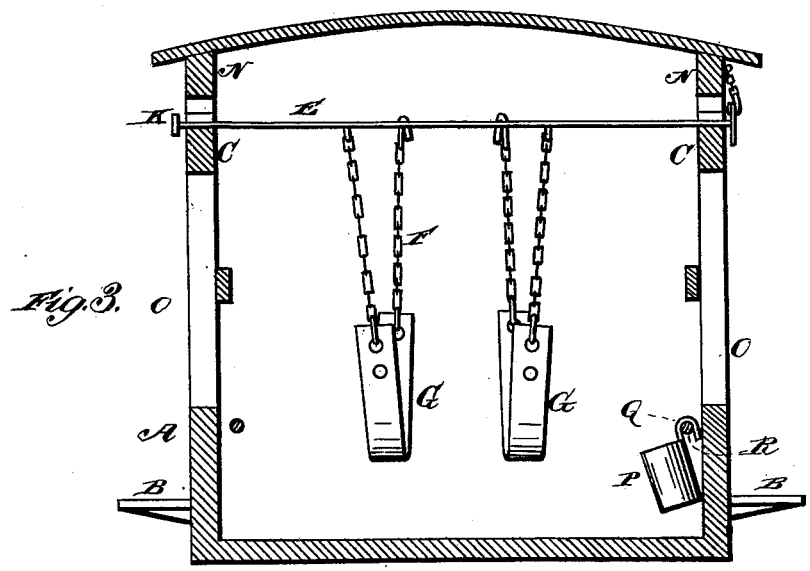

UNITED STATES PATENT OFFICE.

FREDERICK W. BECKER, OF WINONA, MINNESOTA.

STOCK-CAR.

SPECIFICATION forming part of Letters Patent No. 229,659, dated July 6, 1880.

Application filed February 26, 1880.

*To all whom it may concern:*

Be it known that I, FREDERICK W. BECKER, of Winona, in the county of Winona and State of Minnesota, have invented certain new and useful Improvements in Cattle-Cars; and I do hereby declare that the following is a full, clear, and exact description of the construction and operation of the same, reference being had to the annexed drawings, making a part of this specification, and to the letters and figures of reference marked thereon.

Figure 1:
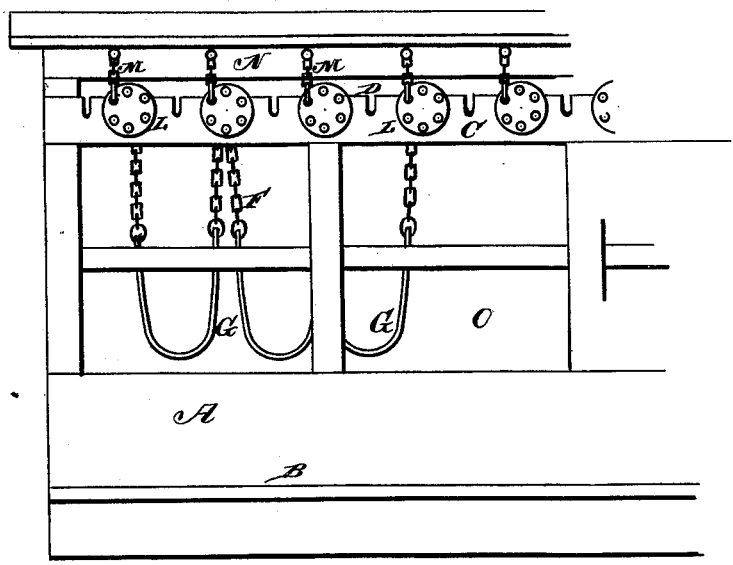
Figure 2:
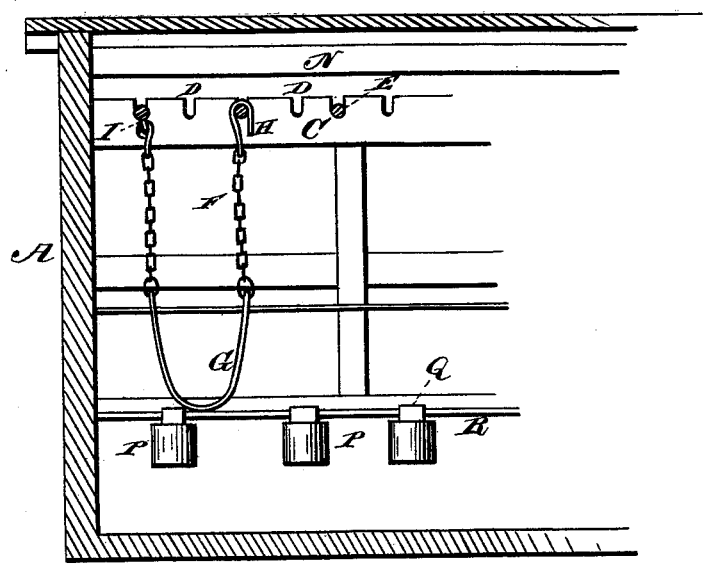

Figure 1 of the drawings is a side elevation of my device, showing a part of a car, and Fig. 2 is a longitudinal sectional view of the same. Fig. 3 is a transverse sectional view.

The nature of my invention relates to certain improvements in cattle-cars, as herein fully described, and particularly pointed out in the claims.

A designates the car-body, alongside of which are platforms B, for an attendant to walk upon.

C C designate upper side beams running the length of the car. These beams have notches D, into which are fitted the ends of the metal cross-rods E, to which rods are connected the chains F of the supporting-bands G. The chains are arranged as herein shown, so that to each rod will be connected two loose hooks, H, and the chains which depend therefrom, and also two chains connected with hooks I, permanently fastened to the rods. Hence the short chain of one end of a band will be connected with a rod by a detachable hook, and at its other end it will be connected with the next rod in the series by the engagement of the short chain of such end with a hook permanently secured to the said rod. This arrangement facilitates the raising of the cattle on either side, since by turning the rods only the chains attached to the fast hooks will be wound around them.

The rods may be shifted from notch to notch, thus accommodating the belts to the width of the cattle. On one end of each rod is a stop or nut, K, to prevent it slipping endwise, and on the other end is a wheel, L. These wheels consist of perforated disks or of wheels with notched spokes, either the perforations or the notches being concentric with the circumference of the wheel.

M are short chains bolted or otherwise secured to one of the beams N above one of the beams C, said chains being provided with hooks to engage in the lines of perforations of the wheels, thus preventing their rotation after the chains have been wound upon the rods.

O designates windows, through which the cattle may be inspected by the driver, and through which feed or water may be passed into the buckets P. These buckets have bent lips or ears Q, which catch upon an iron rod, R, extending the length of the car.

The buckets may be shifted along this rod, as desired.

The cattle will be arranged in the car with the belts passed beneath them, so as to allow their feet to press lightly upon the floor, thereby relieving them from the fatigue incurred by a long journey.

What I claim is—

1. The car-body A, provided with platforms B, and upper side beams, C, with notches D, for the reception of rods E, arranged as set forth.

2. The combination, in a cattle-car, of the rods E, wheels L, and chains M, having hooks, with the chains F, bands G, loose hooks H, and fast hooks I, substantially as shown and specified.

In testimony that I claim the above I have hereunto subscribed my name in the presence of two witnesses.

FREDERICK W. BECKER.

Witnesses:
A. N. BENTLEY,
L. FOON WIMPFFEN.